(12) United States Patent
Carmeli

(10) Patent No.: US 6,865,672 B1
(45) Date of Patent: *Mar. 8, 2005

(54) SYSTEM AND METHOD FOR SECURING A COMPUTER COMMUNICATION NETWORK

(75) Inventor: Haim Baruch Carmeli, Rosh Haayin (IL)

(73) Assignee: Spearhead Technologies, Ltd., Rosh Haayin (IL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/301,113

(22) Filed: Apr. 28, 1999

(30) Foreign Application Priority Data

Aug. 18, 1998 (IL) .................................... 124531

(51) Int. Cl.⁷ .......................... H04L 9/00; G06F 11/30
(52) U.S. Cl. .................... 713/155; 713/153; 713/154; 713/194; 713/200; 380/42
(58) Field of Search ................................ 713/153–155

(56) References Cited

U.S. PATENT DOCUMENTS

| | | | |
|---|---|---|---|
| 4,882,752 A | 11/1989 | Lindman et al. | 713/166 |
| 5,283,828 A | 2/1994 | Saunders et al. | 713/192 |
| 5,781,550 A * | 7/1998 | Templin et al. | 713/201 |
| 5,940,591 A * | 8/1999 | Boyle et al. | 713/201 |
| 6,067,620 A * | 5/2000 | Holden et al. | 713/155 |
| 6,115,819 A | 9/2000 | Anderson | 713/200 |
| 6,212,558 B1 * | 4/2001 | Antur et al. | 713/201 |
| 6,212,636 B1 * | 4/2001 | Boyle et al. | 713/168 |
| 6,240,186 B1 * | 5/2001 | Hyde et al. | 380/255 |
| 6,243,815 B1 * | 6/2001 | Antur et al. | 713/201 |
| 6,321,337 B1 * | 11/2001 | Reshef et al. | 713/201 |

FOREIGN PATENT DOCUMENTS

WO 9618253 6/1996 .......... G06F/12/14

* cited by examiner

*Primary Examiner*—Justin T. Darrow
*Assistant Examiner*—Kambiz Zand
(74) *Attorney, Agent, or Firm*—Jones Day

(57) ABSTRACT

A system for providing a trusted computer communication network including a master decision maker unit coupled to the trusted network; and at least one slave communication unit coupled to the master unit by a wide bus connection that has multiple unidirectional communication channels, and connected to a non-trusted network; wherein the trusted network is physically isolated at all times from the non-trusted network, and all data transported between the trusted network and the non-trusted network is transported between the master unit and the slave unit.

28 Claims, 10 Drawing Sheets

SYSTEM AND METHOD FOR SECURING A COMPUTER COMMUNICATION NETWORK

FIELD OF THE INVENTION

The present invention relates to network security in general and, in particular, to a system and method for providing a trusted network which can be connected to a non-trusted network and remain secure.

BACKGROUND OF THE INVENTION

Nowadays, as network security has become one of the major networking technology issues, many vendors offer a wide range of security products, solutions and methodologies.

The most common security solution is the FIREWALL system. A FIREWALL is a system that is based on the TCP/IP standard. According to that standard, a stream of data is actually a collection of packets. Each and every packet has a header that describes that packet. The most important information fields that are included in a packet header are the address of the source (which indicates who sent that packet), the address of the destination (which marks for whom this packet is intended) and the number of that packet in that stream of data. Each and every stream of data may contain a single packet or many packets. While a traditional router normally checks the stream authorization by its first packet header only, the FIREWALL checks each and every packet header. The FIREWALL can stop the streaming as it detects an illegal packet, one whose source or destination is not allowed by the network administrator, even if that packet is not the first one. Moreover, a FIREWALL can limit the streaming into specific ports and disable other ports access. But that kind of security is not enough to protect a trusted network against intrusion.

First, it is a very easy to change a computer TCP/IP address. Suppose somebody knows that the trusted network FIREWALL allows a machine from address X, port Y to communicate with an internal network member at address Z, same port Y. All the intruder has to do is to define its machine address to X, connect it to that network, and send data through port Y to address Z. Not only is changing a TCP/IP address a very easy thing to do, it can be done without leaving any traces.

Second, FIREWALLS always check the port where data came from. Smart intruders know how to use the enabled ports in order to overcome the FIREWALL system. For example, the FTP service is based on two opened ports, one for establishment and one for file transfer. A smart intruder uses the FTP mechanism in order to send data into the network. He follows the establishment process and the first time the file transfer port is enabled, he communicates through this port.

One of the most destructive ways to break into a system is an intrusion by trusted people. According to official research more than 50% of intrusions are caused by configuration errors made accidentally by trusted administrators. An organization network is a very complicated system. It consists of many TCP/IP addresses to be access enabled or denied, many services to be enabled or ignored etc. An error where a specific address becomes accessible to the outside world is not a rare occurrence. All an intruder has to do is to scan the organization addresses and services to find the first address and service that was not hermetically closed, and that address will become the gate where these intruders will come through. Unfortunately, such a situation is not rare, and detection of such an intrusion is very difficult.

Third, as FIREWALL is the only gate through which all communication must pass, that system presence becomes a very sensitive matter. There are cases where the FIREWALL is stopped and the trusted network becomes suddenly unprotected and directly connected to the outside world. Such situations may occur if security software is "crashed", operating system is "stuck in" (but its communication kernel is running), an administrator disabled the FIREWALL "just for couple of minutes", etc. The latter situation is very common. An intruder sends many packets of data to the trusted network, into an enabled and accessible address and port. That incoming stream of packets may lead to an overload situation, as the network is required to transfer these packets. If the load is too high, the network delay becomes very high also. It is known that for test and maintenance procedures, as well as problem diagnostic processes, network administrators sometimes disconnect the FIREWALL for a few minutes, in order to check if the problem comes from that device. That is the time when a smart intruder goes inside the net, sends its hostile program into any address and makes it executable.

There are many more situations where the FIREWALL cannot provide a good enough security solution for the trusted network.

A conventional solution to the security problem is a packet filter. A packet filter, whether it is based on a TCP/IP address or a specific service port, cannot be assumed nowadays to be a good solution for content threats. Viruses, Trojan horses and other hostile codes cannot be detected by the packet filter. A packet is the native form of transported data. Packet length may vary independently, packet timing may be spread randomly, the order the packets are received is not necessarily the order they were transmitted, and other native features cause a content detection process to work very hard in order to detect transported hostile applications at packet level.

Many security products use third-party technologies to detect viruses, Trojan horses, Active X or Java scripts. All these products operate while data is moved from one node to another. As it moves, the data transportation delay time becomes a significant factor. Hence, many detection tools cannot exhaust their detection capabilities, as it takes too much time to implement the best detection algorithms. As a compromise solution, these tools look for a set of patterns and "signatures" that already are known as hostile code traces.

Another conventional solution is the application gateway. The concept of this mechanism is to build a gate where applications can send and receive messages. A message is actually a collection of packets. The FIREWALL moves the message to a specific application, usually a third-party one, and that application is required to handle that message, to accept it, to change it or to ignore it.

As was mentioned before, such a mechanism cannot provide the best results offered by current hostile code detection technology. A message, although it represents a closed block of data, may hide part of hostile code, not necessarily one that can easily be detected. As message transportation time is a major factor, detection time becomes important and as a result, all the currently used tools make a relatively superficial test of messages in order to quickly detect patterns and signatures of known hostile applications, as fast as possible.

Accordingly, there is a long felt need for and it would be very desirable to have a system and method for providing a trusted network which permits high detection of hostile applications, prevents unauthorized access and services in the network, while permitting the trusted network to be connected to a non-trusted network which has access to conventional TCP/IP applications.

SUMMARY OF THE INVENTION

The present invention presents a radically different approach to the solution of network security problems.

According to the present invention, there is provided a system for providing a trusted computer communication network including a master decision maker unit coupled to the trusted network, and at least one slave communication unit connected to the master unit by a wide bus (a connection bus that has multiple unidirectional communication paths) and connected to a non-trusted network, wherein the trusted network is physically isolated at all times from the non-trusted network, and all data transported between the trusted network and the non-trusted network is transported between the master unit and the slave unit.

According to a preferred embodiment of the invention, the master unit includes a master computer coupled for standard computer communication with the trusted network, and coupled via a standard computer bus to a master wide bus gate card, and the slave unit includes a slave wide bus gate card coupled via a wide bus, as defined in the specification, to the master wide bus gate based card and via a computer bus to a slave computer which, in turn, is connected to the non-trusted network for standard computer communication.

According to an alternative embodiment of the invention, the system further includes a second slave unit, and possibly more slave units, coupled between the trusted network and the master unit.

There is further provided in accordance with the present invention a method for securing a trusted computer communication network including the steps of disconnecting the trusted network from all non-trusted computer communication networks, inserting a system between the trusted network and the non-trusted network, the system including a master decision maker coupled to the trusted network and a communication slave, and permitting transportation of data between the trusted network and the non-trusted network only with the permission of the master decision maker.

According to a preferred embodiment of the invention, the step of inserting includes inserting a master unit including a master computer and a master wide bus gate card which constitutes a master decision maker, and a slave unit including a slave computer and a slave wide bus gate card which constitutes a communication slave, by coupling the master computer to the trusted network, coupling the master wide bus gate card to the slave wide bus gate card, and coupling the slave computer to the non-trusted network.

According to a preferred embodiment, the step of examining includes examining each file for improper authorization and hostile programs.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
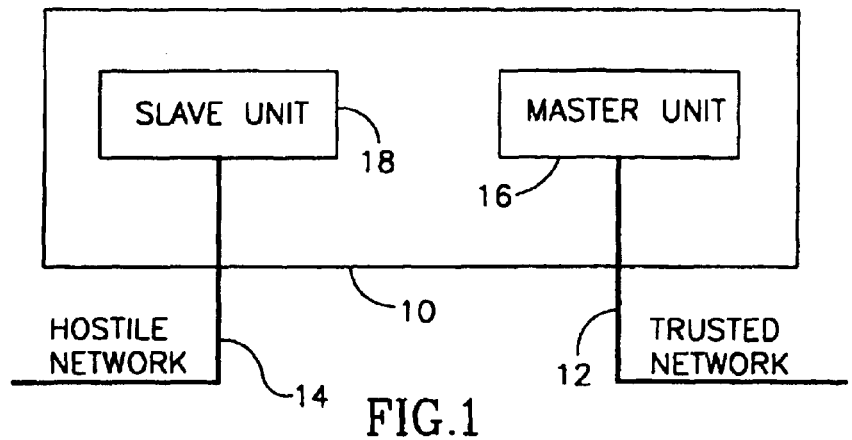
FIG. 1 is a schematic illustration of a system for securing a network constructed and operative in accordance with one embodiment of the invention.

The system of the present invention offers a radically different observation point on the computer communication network security problem. The system physically cuts the wire between a trusted and a non-trusted network, and replaces the usual TCP/IP system by a special mechanism. That mechanism is not peer-to-peer based (as TCP/IP is), but a handshake mechanism, and it is controlled from the trusted side only. Thus, this system prevents the non-trusted side from enforcing communication processes, pushing data independently and overloading the trusted network, by requiring master unit approval of all communication processes.

It is a particular feature of the invention that the system imports and exports static data, such as files, records, blocks, etc., rather than a stream of packets. When data is stored as a static block of data, all its information items are collected together, in a static state, in the right order. As static data is imported from the non trusted side to an isolated location, whether in the trusted network or an isolated area between the two nets, this static data is completely checked by third-party detection tools for viruses and other hostile program. Since the data is checked under isolated and static conditions, all at once, these tools can reach their best detection performances, with the highest detection probability, as compared to other security systems and methodologies.

It is a further particular feature of the system that, in addition to the above features, it provides isolation of the trusted network forever, at run time, when data is transported and even in case of a software "bug", "crash", back door or any kind of failure. Since the networks are not connected directly, and there are four to seven different independent stages that separate the trusted and the non-trusted nets, the possibility of a "short path", where these two nets will become suddenly connected to each other, is practically zero.

Basically there are four things that make this system quite different from conventional security systems:

It physically continuously disconnects ALL operating system services and all network services, as it cuts the network wire.

It physically continuously isolates the two networks, the trusted network and the non-trusted one.

The security level provided by this product does not depend on the stability factor of the operating system or the software.

Data cannot be moved from one net to another unless it is in a static state, and has approval from the master unit.

Thus, the trusted network will never be exposed to the non-trusted network services or operating system, even when the transportation process takes place and even if the operating system, as well as other software components, "crash" or fail to run. Furthermore, detection of a hostile code will always be done in the master side, in the most thorough manner possible with the then current technology, and with the highest probability of detection, as compared with other security systems and products.

Referring now to FIG. 1, there is shown a schematic illustration of a system for protecting a trusted computer communication network constructed and operative in accordance with one embodiment of the invention. The system of the invention includes a box 10 that connects two networks, a trusted network 12 and a non-trusted network 14. All transportation processes must be handled by this box 10. Like many other security systems, the system of the invention is the only gate where data can be moved between the trusted network and the non-trusted network.

Unlike other security products, the present system includes more than a single unit. As seen in FIG. 1, the system consists of two kinds of units, a master unit 16, which initiates and/or approves all data transportation processes, and a slave unit 18, which obeys the instructions of the master unit, and as a result, responds or executes those processes. It will be appreciated that these terms merely designate the relationship between these two units. There are two major configurations of the system of the invention: a two-stage device, illustrated in FIG. 1, and a three-stage device, shown in FIGS. 2a and 2b and described hereinbelow. The two-stage device includes one master unit and one slave. The three-stage device 10' includes one master 16 and two slaves 18, 18', with the master unit located in the path between the two slaves. In addition, it is possible to add, in any configuration according to the invention, a separate unit 19 to perform computations and help reach security decisions, as shown, for example, in FIG. 2b.

As stated above, the system has two connection points. One is connected to the network that is assumed to be the non-trusted network, called herein "the hostile network". The other point is connected to the "secure network", the one that is considered as the confidential network and that is to be protected from hostile network attacks. As shown in FIG. 1, for both system types, a slave unit is the only one that is connected to the hostile side. In the two-stage device, the master unit is connected to the trusted network. In a three-stage device, the master network is not connected directly to either of the networks, but is isolated from both sides.

Figure 3:
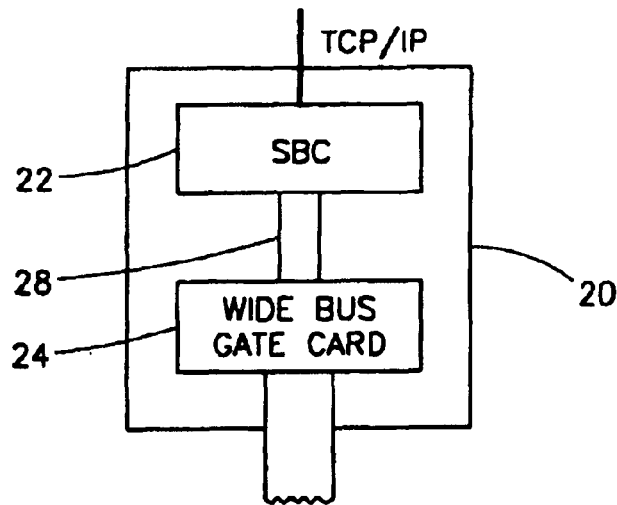
FIG. 3 is a schematic detail view of a master unit or slave unit according to a preferred embodiment of the invention.

Referring now to FIG. 3, there is shown a schematic detail view of a unit 20 constructed and operative in accordance with a preferred embodiment of the invention. Each unit 20, whether it is a master unit or a slave unit, has two sections: a computer section 22, here implemented as a Single Board Computer (SBC), and a wide bus gate card 24. For ease of description, computer section 22 will be referred to as an SBC throughout the specification. It will be appreciated, however, that alternatively computer 22 can be another other suitable computer, or a number of SBC units, all coupled to the wide bus gate card.

Wide bus gate card 24 includes a logic gate array chip, currently implemented by an FPGA (Field Programmable Gate Array) or ASIC (Application Specific Integrated Circuit), and may include an associated microprocessor (CPU) for fast computations and other functions, as desired. Alternatively, wide bus gate card 24 can include a number of wide bus gate units, all coupled to the SBC. Wide bus gate card 24 is not an operating system based card. Rather, it is a chip-based circuit that does not use any operating system-based protocol for data transportation. It will be appreciated that this card is a dedicated card, designed for implementation of the present invention. Both the SBC 22 and the wide bus gate card 24 use a combination of software and hardware, as described hereinbelow. Both sections include at least one independent CPU (not shown) that runs, independently, its own program. It will be appreciated by those skilled in the art that some or all of the functions described herein as being performed by wide bus gate card 24 could alternatively be performed in the SBC (i.e., virtual) and, vice versa, some or all of the functions described herein as being performed by the SBC could alternatively be performed by wide bus gate card 24 (i.e., hardware).

The SBC 22 can include any conventional single board computer, and is preferably a Windows NT™ operating system-based application, which runs the application of the present invention as the main Windows NT™ task. Alternatively, any other suitable operating system can be utilized.

Figure 2A:
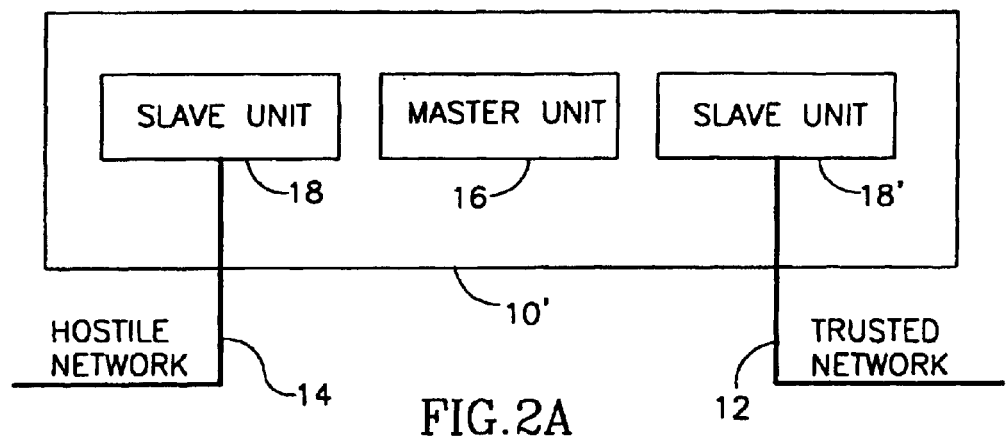
FIG. 2a is a schematic illustration of a system for securing a network constructed and operative in accordance with another embodiment of the invention.

In the three-stage device illustrated in FIG. 2a, the master unit includes one SBC and two wide bus gate cards, or one wide bus gate card capable of communicating with both slave units. The master SBC is not connected to any network. Each master wide bus gate card is coupled to the slave wide bus gate card in one of the slave units. It will be appreciated that the wide bus gate card of the slave need not be identical to the wide bus gate card of the master.

Figure 2B:
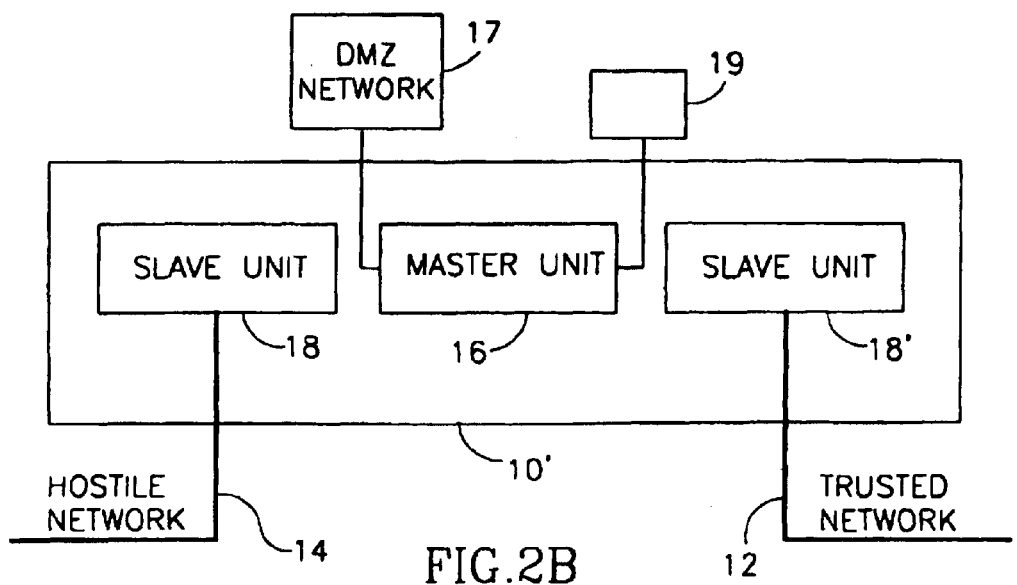
FIG. 2b is a schematic illustration of a system for securing a network constructed and operative in accordance with yet another embodiment of the invention.

In the three-stage device illustrated in FIG. 2b, the master unit is coupled to an additional network, known as a DMZ (De-Militarized Zone) network 17, which is not connected either to the trusted network or to the non-trusted network. A DMZ network provides a network which is completely protected and physically isolated both from users outside a trusted network and from users inside a trusted network. Import and export of data from the DMZ network is carried out in the same manner as between the trusted and non-trusted networks, as described in detail hereinbelow.

Figure 4:
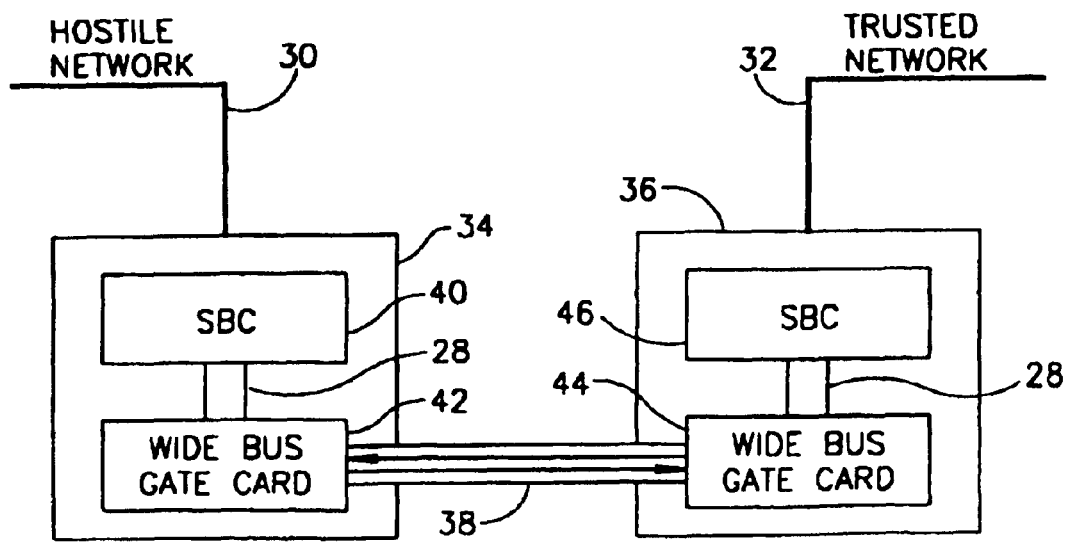
FIG. 4 is a schematic illustration of a system for securing a network according to one embodiment of the present invention.

Referring now to FIG. 4, there is shown a schematic illustration of a system for protecting a trusted network 32 from a hostile, or non trusted network 30, constructed and operative in accordance with one embodiment of the present invention. The system includes a slave unit 34 coupled to the hostile network 30, and a master unit 36 coupled to the trusted network 32. Slave unit 34 includes an SBC 40 and a wide bus gate card 42. Master unit 36 includes an SBC 46 and a wide bus gate card 44. Slave unit 34 is coupled for communication to master unit 36 via a wide bus 38. It will be appreciated that, in this way, hostile network 30 is physically isolated at all times from trusted network 32.

Wide bus 38 is a non-supported high-speed bus, which consists of essentially any connection bus having several unidirectional data channels or communication lines that connect two wide bus gate cards. Each channel can be, for example, an 8, 16 or 32 bits wide channel. Each card has its own input and output channels, sending its own data through the output channel, and receiving incoming data through the input channel, in sequence or in parallel.

In operation, data to be transported is written into the output channel of the sending unit. Receiving of written data is up to receiver card only. If the receiver refuses to handle the incoming data, the sender can do nothing, as it cannot control the way the other card works.

As will be described later, communication through wide bus 38 is not a simple IO operation based communication. It is clear that the wide bus does not support the standard computer network systems, since all these systems were designed for a standard single-line Ethernet connection, rather than a parallel multiple-line bus. Wide bus 38 is not only a multiple-line bus that is unsupported by commercial communication standards or standard operating systems, but it also has the ability to avoid any kind of data transportation process, even simple native IO commands, that were executed by the processor itself.

The standard computer communication network, whether it is the hostile or the trusted net, is always connected to the SBC. Units exchange data through the wide bus gate card, and only through these sections. The internal communication between the SBC and the wide bus gate cards is done through a standard computer 28 (shown in FIG. 3), which may be, for example, a PCI or ISA bus. The SBC can freely write data to the wide bus gate card, but does not have direct access to the wide bus.

It will be appreciated that the master and slave units are not identical. It is a particular feature of the present invention that only the master unit can approve a communication process. The slave unit executes such processes, but it cannot create a new communication process by itself, unless it was approved by the master. In addition, the slave can request the master to initiate a communication process but the master unit can ignore that request or refuse to complete it. Thus, since the master unit is connected to the trusted network only, or is isolated from both sides as in the case of a three-stage device, the communication process cannot be controlled by the non-trusted side, in any case.

Figure 6:
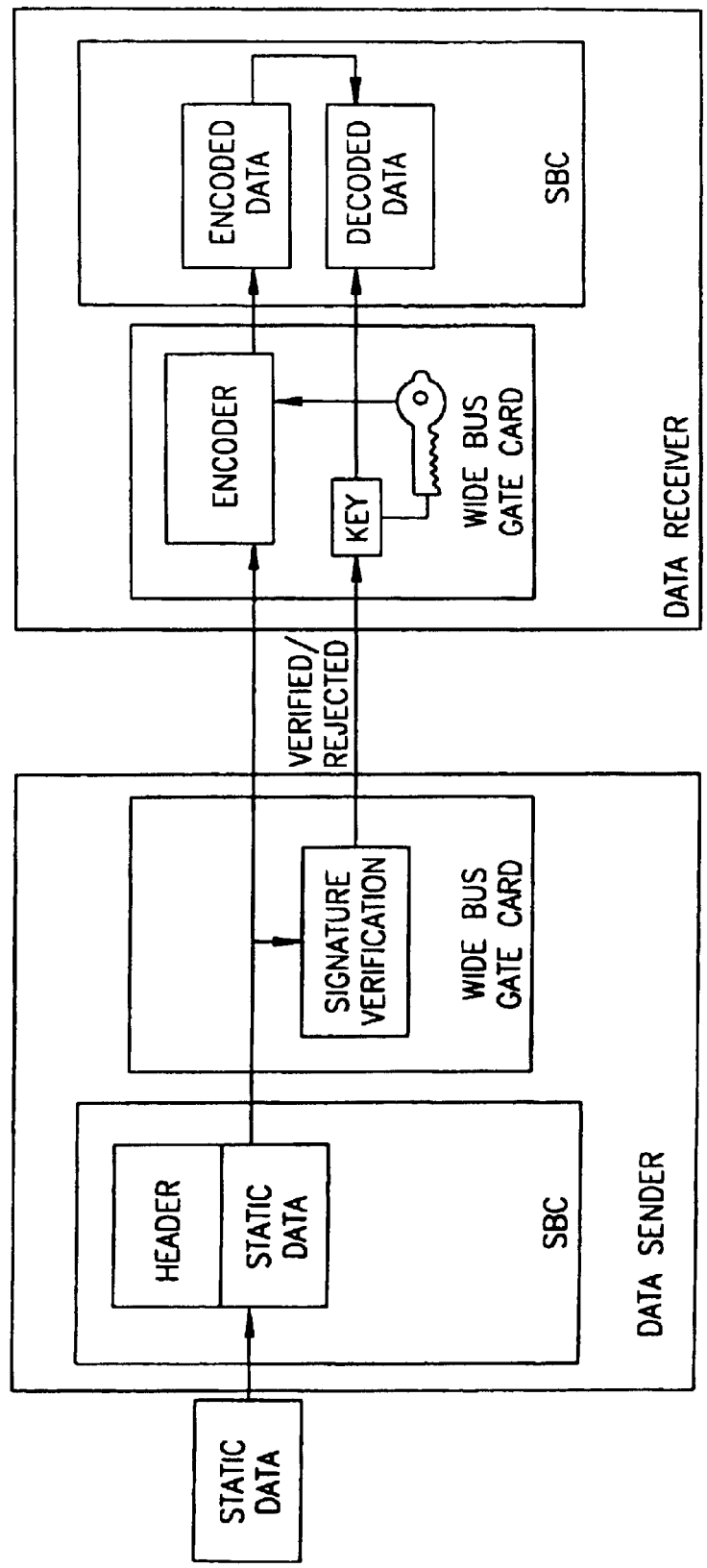
FIG. 6 is a schematic illustration of the file transmission process according to the invention.

With further reference to FIG. 4, the information transport process from one net to the other, illustrated schematically in FIG. 6, will now be described in regard to a two-stage device, by way of example. According to the concept of the present invention, a "communication process" is a process that copies static data, any kind of data (file, record, block), from one memory in one network, to another memory region in the other network. In order to move data from one side to another, the master unit must enable an "data import" or a "data export" process.

A data import process is a process where static data is pulled from the hostile network into the trusted one. This data must be checked against hostile code such as viruses, Trojan horses, Java scripts, Active-X components etc. A data export process is a process that pushes static data from the trusted network to the hostile one. In this case, the content will be checked in order to avoid confidential data leakage. In both cases the master unit is the only unit that can enable or disable the process of moving static data from one net to another.

As seen in FIG. 4, between the hostile network 30 and the trusted network 32, there are four different sections, two in each unit 34, 36. The wide bus 38 that connects units 34 and 36 has several unidirectional channels. There are two important channels in each unit that are relevant to the communication process discussion. One is called the "input channel" and the other is the "output channel". Each and every unit has both channels. Each and every unit can transmit static data through the "output channel" and it independently receives other static data through its "input channel", either in sequence or in parallel.

Five steps are required for importing data from the hostile side into the trusted one:

Step 1: The hostile side SBC 40 picks up the data and stores it in its memory.

Step 2: Hostile side wide bus gate card 42 pulls that data from the SBC memory and moves it to the trusted side wide bus gate card 44.

Step 3: The trusted side wide bus gate card 44 moves the data to the memory of the trusted side SBC 46.

Step 4: The trusted side SBC 46 checks the stored content against hidden hostile code.

Step 5: The trusted side SBC 46 copies the stored approved data to the appropriate location in the trusted side (if no hostile code was detected in step 4).

Figure 7A:
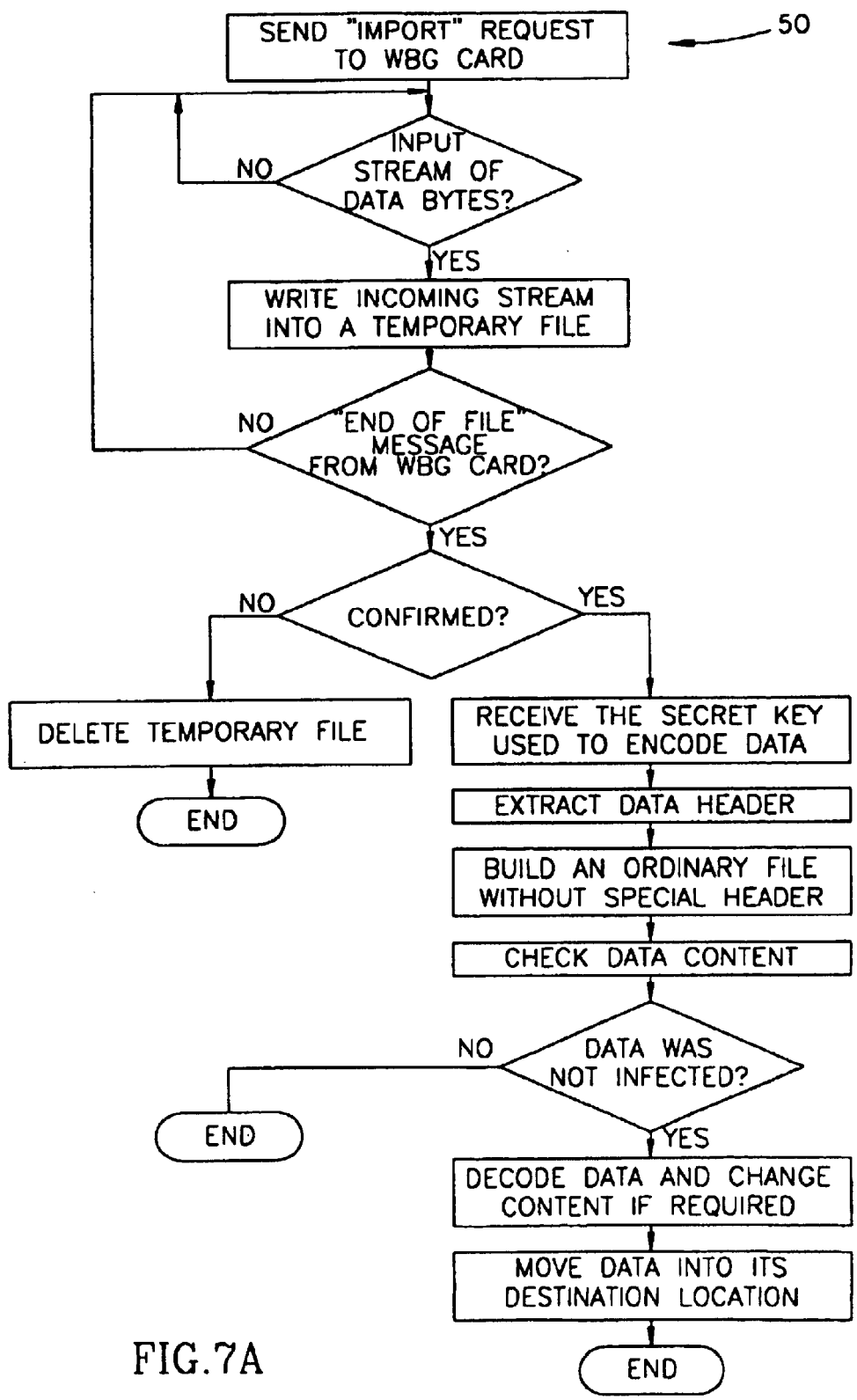
FIGS. 7a, 7b, 7c, and 7d are flow charts of the functions of a sender and a receiver during the file transmission process according to the invention.
Figure 7B:
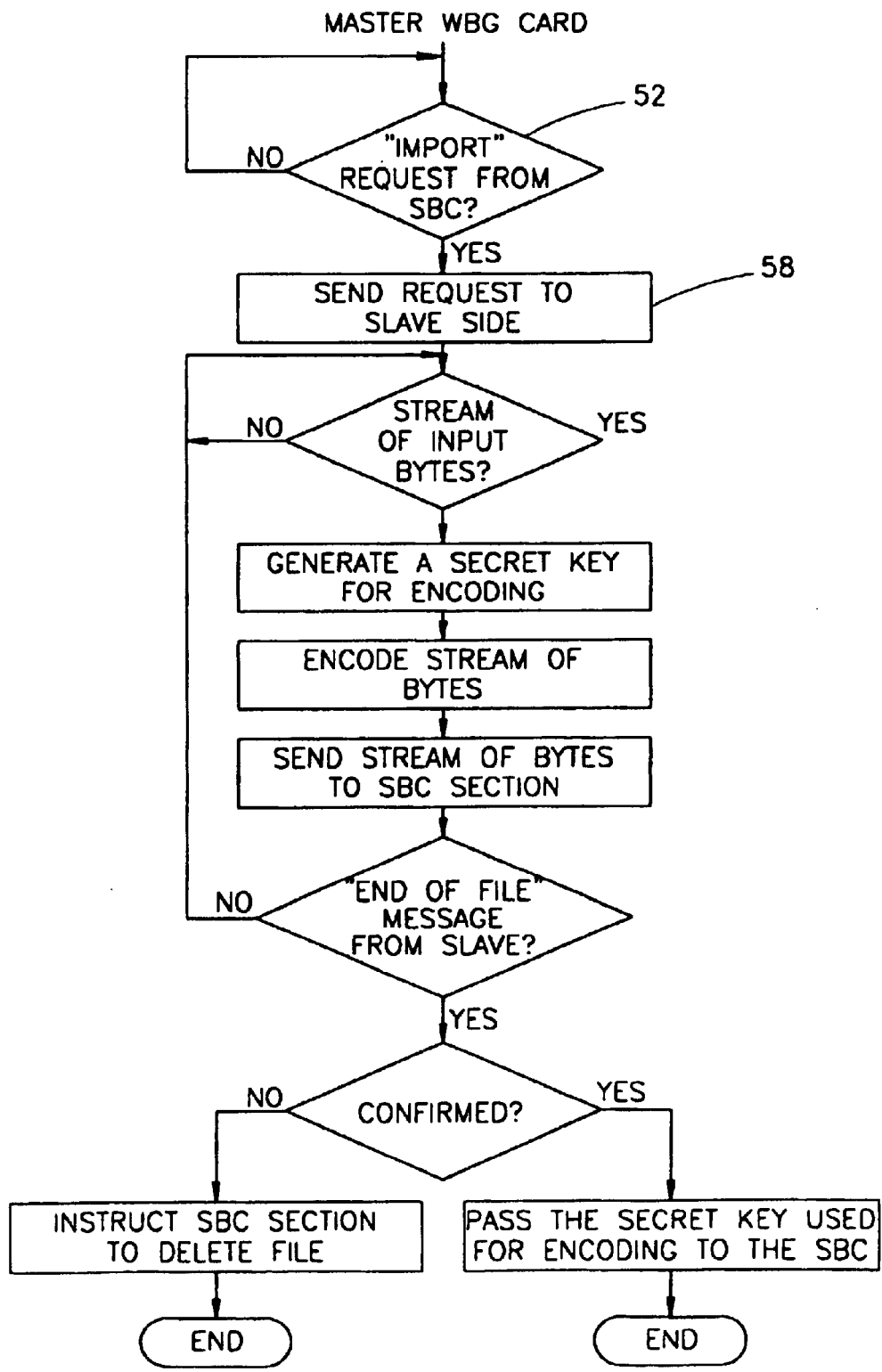
Figure 7C:
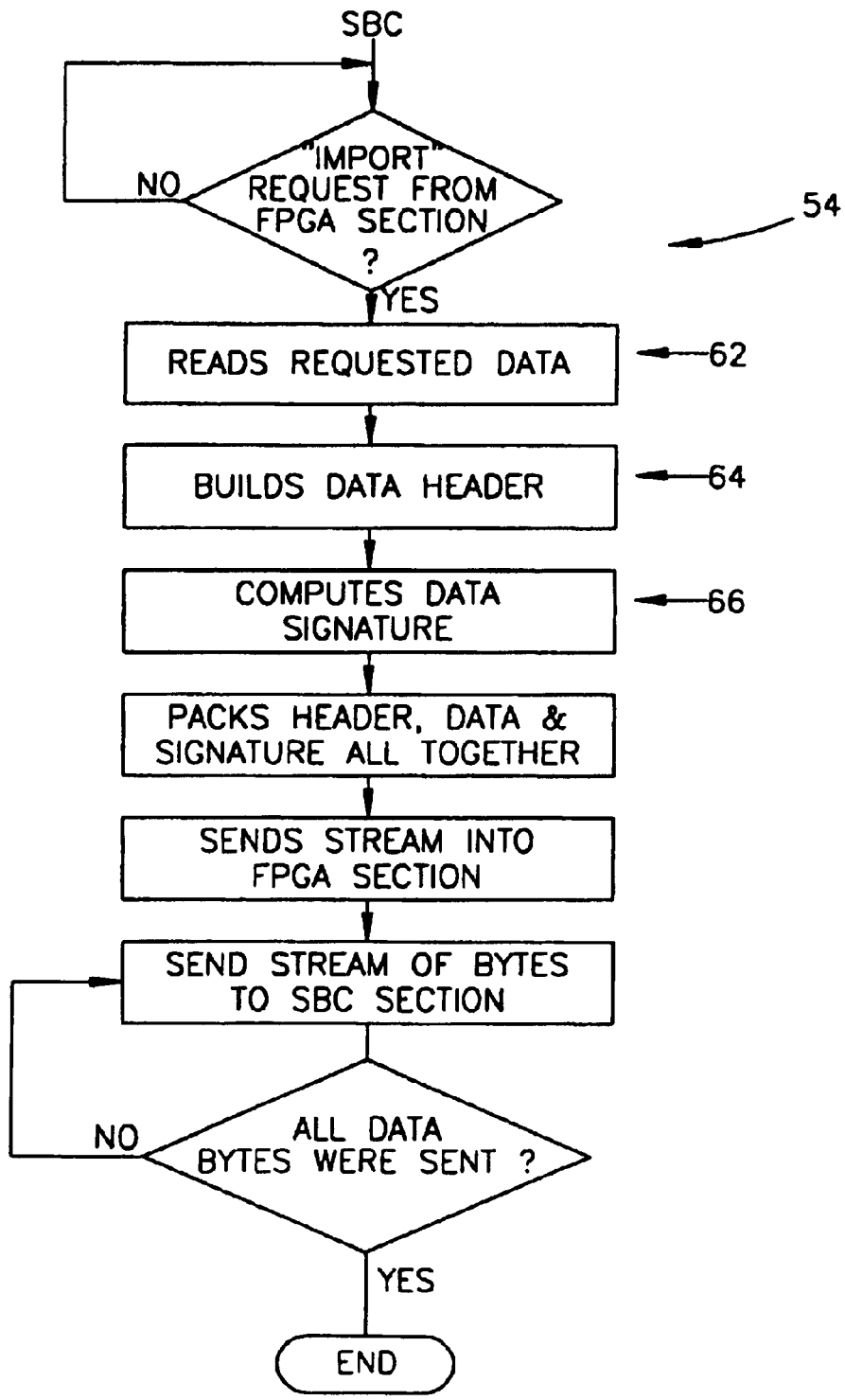
Figure 7D:
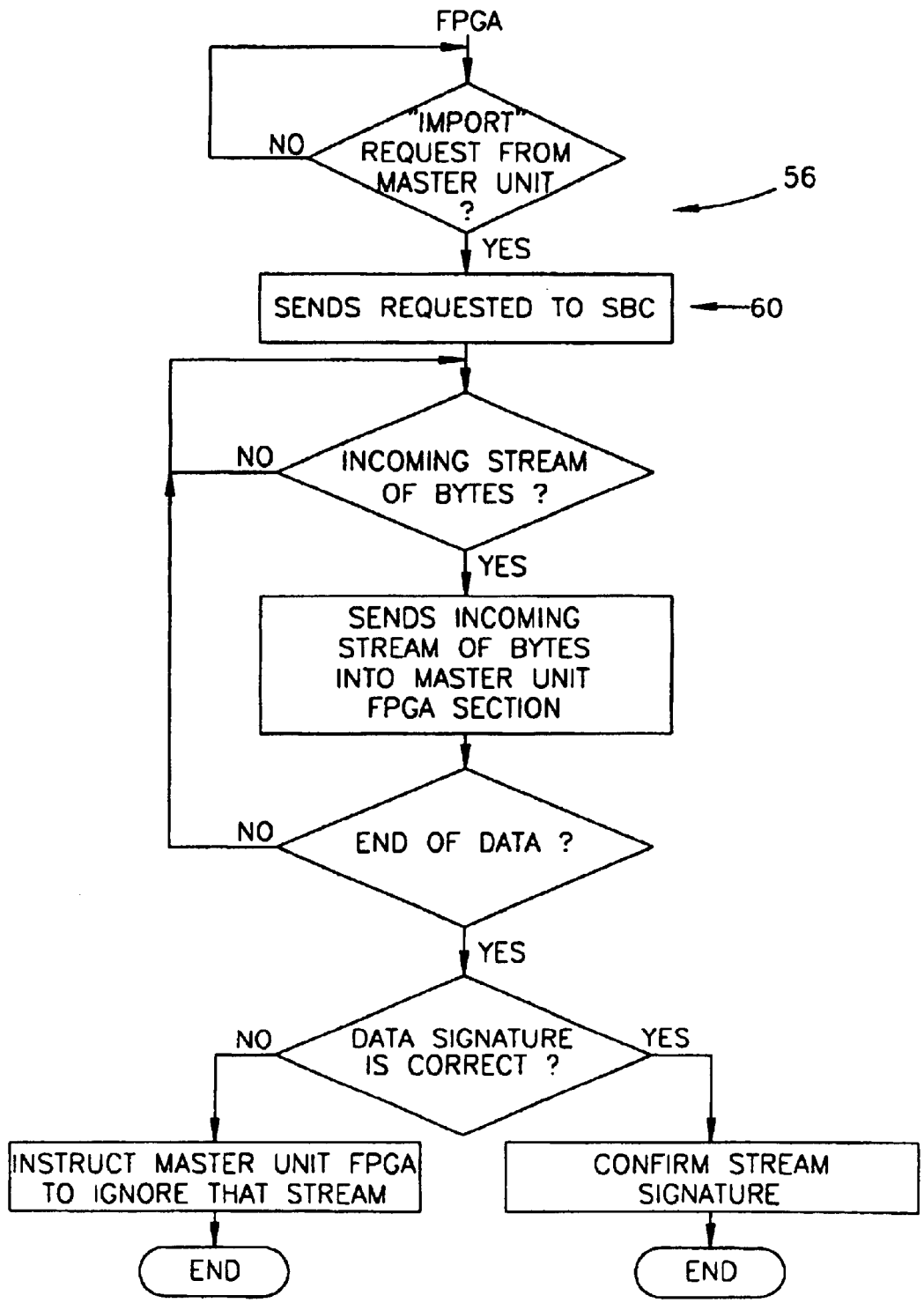

Each step will now be described in detail. Flow charts of the functions of the master unit (in this case, the receiver) and the slave unit (in this case, the sender) are shown in FIGS. 7a, 7b, 7c, and 7d. First, the master SBC 46 sends an import request to the master wide bus gate card 44 (FIG. 7a, block 50). When master wide bus gate card 44 receives an import request message (FIG. 7b, block 52), the master wide bus gate card 44 sends a request to the slave wide bus gate card 42 for that file (FIG. 7b, block 58). When the slave wide bus gate card receives the request (FIG. 7d, block 56), it forwards the request to the slave SBC 40 (FIG. 7d, block 60). These requests can be signed, and/or coded, and/or encrypted, as desired. When slave SBC 40 receives the import request from wide bus gate card 42 (FIG. 7c, block 54), slave SBC 40 reads the entire required data from where it is currently stored (FIG. 7c, block 62), and builds data header record (FIG. 7c, block 64). The header is a fixed size record that contains information about the data such as its age, size, where it was stored, etc. The data header can include additional parameters, such as communication information. In addition, the header includes the original location (source) and destination address. The most important field in the data header is the signature, which is computed by slave SBC 40 (FIG. 7d, block 66). Without a signature, no data can be used in the network in which it is received.

According to a preferred embodiment of the invention, the signature is a large number (e.g., 1024 bits long), that "describes" the specific collection of bytes that are stored inside the header record and the entire data content. One example of static data to be transported, including its header, is shown schematically in FIG. 8. It is generated from both the file header and content bytes. Preferably, building the signature is based on a special function that takes a secret key and a stream of bytes consisting of the data header and the data content bytes, and as a result generates the signature number. This function is a very fast one. Both the SBC and the wide bus gate cards know the secret key value and, thus, a secret key transaction over the computer bus is not necessary.

Figure 9:
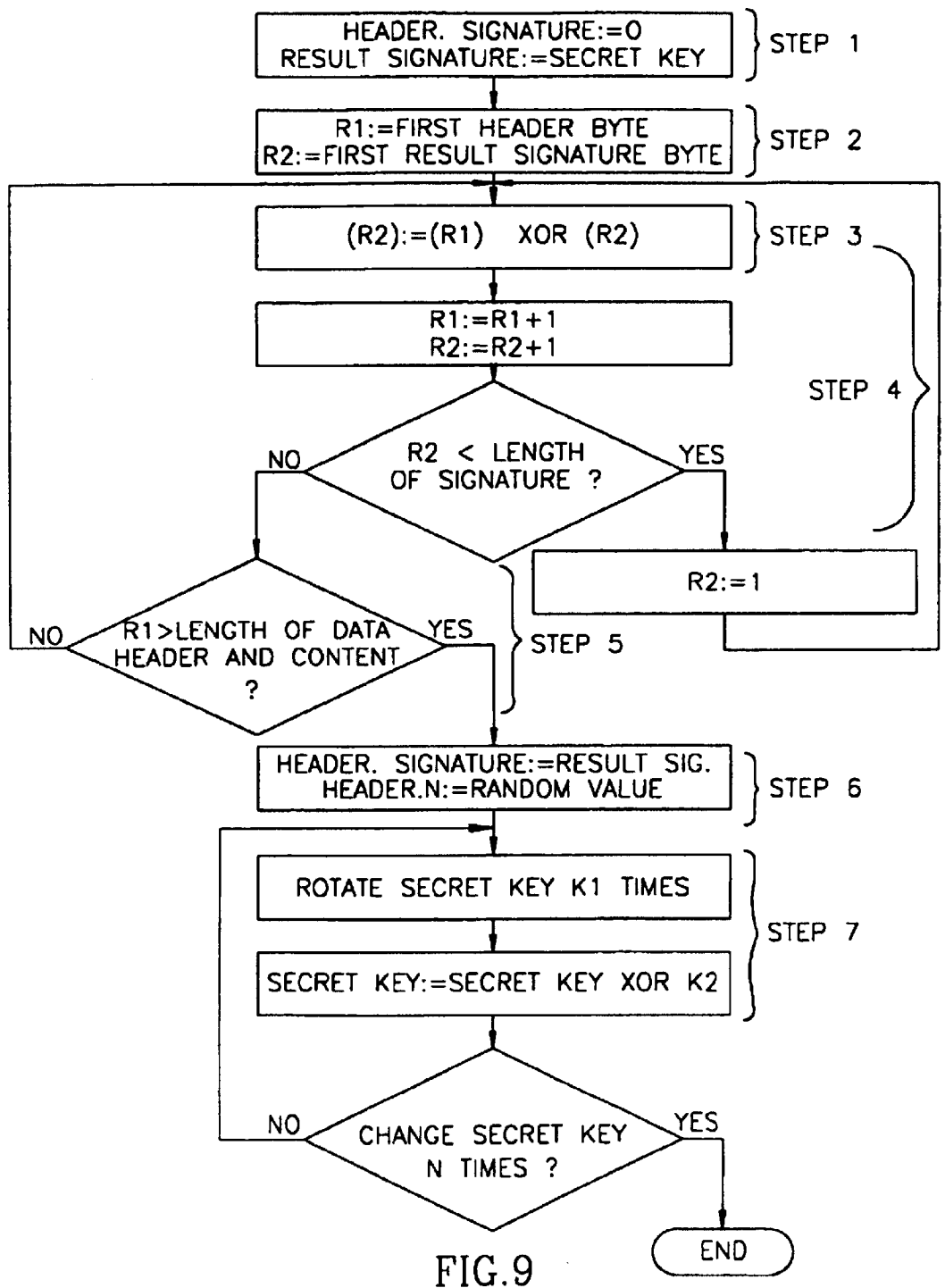
FIG. 9 is a flow chart of the preparation of a file signature according to one embodiment of the invention.

One way to generate a signature for data, whether it is a file, record, or block, is illustrated in FIG. 9. The mechanism is based on a function that takes a secret key, for example, 1024 bits long, and a stream of bytes, and as a result it returns another number of the same length. At the beginning, the function assumes that the file signature is the secret key itself (step 1). Since the secret key is changed every time data is sent, or periodically, even two identical blocks of data may have different signatures. Now the function takes each and every byte from the data header record. Before reading this record, it assumes that the signature field, inside that record, is zero (step 2). This field is to be updated with the new generated signature as the generation process is completed.

Each and every byte is "xored" with the appropriate byte in the current computed signature value (step 3). The first byte from the data header is "xored" with the first byte from the current signature, the second byte from the data header is "xored" with the second one at the current signature, etc. In the given example, the signature value is 1024 bits long (128 bytes). Hence, in this case, the 129$^{th}$ byte from the data header will be "xored" with the first byte from the current signature (step 4). After the data header bytes are completely "xored" with the appropriate bytes in the current signature, the function takes the data content bytes and continues the computation in the same way. As all data content bytes were completely "xored" with the current signature (step 5), the resulting accumulated value is to be the data signature value. That value is now written into the data header record, to the signature field.

The secret key is the basis of the data signature generation process described above. In each unit, both sections use the same secret key, at the same time. However, while the system is running, a transaction of that secret key over the computer bus is not allowed, and a special mechanism is used for synchronization of these two sections. A random numbers generator is used as a part of the secret key generation. Using a conventional pseudo-random generator, which is based on the system clock, may lead to very poor stochastic behavior, as the series of random values may be too short. Therefore, the security system preferably uses a real random numbers generator in order to minimize the secret key guess probability.

A preferred method of generating a secret key is as follows. Secret key generation uses a function that takes three arguments: two permanent values (that will remain constants as long as system is running) and the current secret key value (that will be periodically changed). As a result, it returns a number. That number is the secret key.

The permanent values are randomly generated by the wide bus gate card at startup time. Since, at that time, the system (i.e., the hardware described above) is physically disconnected from both networks, it is safe to send these values to the SBC through the computer bus. In addition, the wide bus gate card generates another number which is considered as the current secret key number, and it sends that number to the SBC, right after the permanent values. Now, both sections are synchronized: both use the same function (because they use the same permanent values) and both start from the same initial value of a secret key.

One example of the function of a secret key generation takes the current secret key and rotates it K1 bits to the right (i.e., bit 0 becomes bit 1023, bit 1 becomes bit 0 and finally bit 1023 becomes bit 1022) then it "xors" it with the K2 value. The K1 and K2 values are the permanent values known to both sections. The resulting number becomes the current secret key. No further actions are required.

Preferably, the secret key is replaced by a new value after data has been moved completely from the SBC to the wide bus gate card (step 7), and upon master wide bus gate card request, generated every couple of minutes, randomly.

Figure 8:
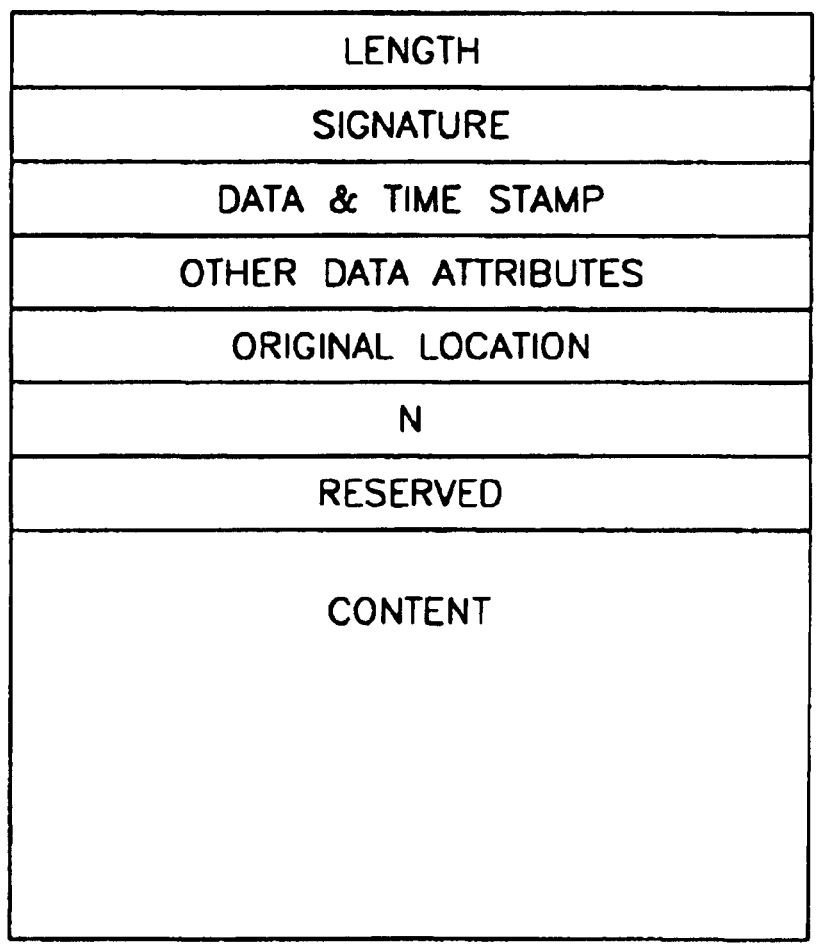
FIG. 8 is an example of a file to be transferred, including a file header.

The secret key can be changed in any manner, as long as it is kept unexposed to the computer bus. One possible method, given by way of non-limiting example only, is as follows. Since at run time the networks' jacks are connected, a transaction of confidential information through the computer bus is not allowed. Hence, the secret key is changed without explicit transportation of the new value. The process is slightly different if the request comes from the SBC or the wide bus gate card. If the SBC wants to change the secret key, it sends a command to the wide bus gate card "please, change the secret key. Repeat this process N times". The N value is randomly generated by the SBC and is the only explicit value that is transferred through the computer bus. Such a command will never be generated by the SBC unless data was completely moved (FIG. 9, step 6). This command will always be a part of a data transport process, and the N value will be part of the data header (FIG. 8). The wide bus gate card will not perform that command if it is not part of a data transport process. Alternatively, any other method of changing the secret key can be utilized.

In response to that command, as long as it appears as part of the transported data header, the wide bus gate card computes the NEXT secret key, the secret key after Nth cycles. At the same time, the SBC changes the secret key in the same manner (FIG. 9, step 7). Now, both sections are synchronized again.

When the wide bus gate card requests the secret key replacement, it sends to the SBC a simple set of commands such as "rotate secret key N bits to the right" or "rotate . . . to the left" or even "invert the secret key bits N1,N2, N3 . . . " etc. Again, no explicit values are moved over the computer bus. Moreover, the commands and their parameters are randomly generated by the wide bus gate card. Both sections execute the commands, the SBC follows the wide bus gate card instructions and the wide bus gate card executes its own, and thus these two sections become synchronized again.

As stated before, a real random values generator is required in order to increase, and spread, the values distribution, over a wide range. Thus, it is most preferred that the random values generator not be a software and clock-based mechanism, but a hardware circuit. This circuit can be based, for example, on a simple ZENER diode, and it samples the noise amplitude generated over that component. (Amplification of that amplitude is required, but it does not change the random behavior of that circuit). As white noise amplitude presents real random behavior, it provides a real random numbers generator. The sampled values are converted into a stream of bits and are used as random numbers.

After the data header construction process is completed, the slave SBC will store this bytes collection in its memory. That collection of bytes has two portions: the first contains the bytes that were stored in the data header record, the second contains the data content bytes.

In step 2, the slave wide bus gate card pulls the data from the SBC's memory, and moves it to the trusted side (master) wide bus gate card. (FIG. 7*d*, block 56). As the first byte is pulled from the slave SBC to the slave wide bus gate card, the latter moves that byte directly and immediately into the wide bus, to the "data input" channel of the other unit, master wide bus gate card. Since the data header is the first block of bytes to be sent, and since it has a fixed size, the master wide bus gate card knows what is the size of the data to be sent right after that header block, and what is the argued signature of that data, as was computed by the SBC.

It will be appreciated that the wide bus gate card is not a part of the SBC operating system or the SBC address space. The only way the SBC and the wide bus gate cards can communicate with each other is by direct pulling of bytes from the SBC's memory by the wide bus gate card. Since the wide bus gate card knows how to extract the data size and the data signature, it pushes the pulled bytes to the other side, and at the same time, it checks if the data pulled from memory was properly signed.

While bytes are pulled from the slave SBC by its slave wide bus gate card, the latter calculates the data signature by itself. After the last byte was pulled and immediately sent to the wide bus gate card, the slave wide bus gate card checks if the computed accumulated signature is identical to the one argued by the originator of that data (which normally should be the SBC card). If they are identical, it means that the data was correctly signed. It should be noted that signing data has nothing to do with network access control, so breaking the signature system, which is very hard to do, does not make the trusted network vulnerable.

If the data signature is verified, then the slave wide bus gate card will signal the master wide bus gate card that the sent data signature was confirmed. If it wasn't, it will instruct the master wide bus gate card to delete that data from the trusted side.

In the third step, master wide bus gate card moves the data to the trusted side (master) SBC's memory. The master wide bus gate card in the trusted side receives bytes that were sent from the slave wide bus gate card, including the data header and the data content.

Each and every byte is received through the "input channel" and it is immediately encoded by the receiver (master) wide bus gate card. This encoding process is based on a specific key, e.g., 1024 bits long, which is known only to the encoder. This key is generated as the first byte is received and it is a part of the wide bus gate card, hence there is no way to successfully guess or extract that key.

Each and every encoded byte is pushed to the master SBC card. The master SBC card is required to store that incoming stream of bytes in its memory. Since that data is encoded, and the SBC knows nothing about how that stream was encoded (i.e., it does not know what the encoding key is), this stored bytes collection has a meaningless content, from a binary or execution point of view. If this data stores any kind of virus, Trojan horse or any other types of hostile code, the hostile code is encoded, and the data is now non-infected, as well as non-usable, data.

The master SBC now checks the stored content against hidden hostile code. The trusted side SBC stores bytes pushed by the master wide bus gate card in their encoded form in its memory. As the last byte is sent from the slave from the slave wide bus gate card, a signature confirmation is requested. That confirmation is to be received from the slave wide bus gate card as was described above in step 2. If the signature is not confirmed, then the trusted side wide bus gate card will instruct its SBC to delete the data from its memory. Since the data is stored as an encoded collection of bytes, nothing is affected when this data is deleted. At that point the communication process is terminated, since the transported data was not verified by the sender.

If the signature is confirmed by the sender, the master wide bus gate card instructs the master SBC to take control of that data. In addition, it "tells" the SBC the secret key that was used for encoding that data. When the key is known, the trusted side SBC can decode the stored content and make it usable. Before making that data usable, the SBC checks its content against viruses, Trojan horses, Active-X components, Java scripts etc. Alternatively, the encoding algorithm can be provided to the software which checks the content, so that it can be examined while still in its encoded, harmless form.

These checks are performed after data is completely moved, and not at the time it is transported, hence the detection tools have the chance to check the whole data content, all at once. Moreover, since the system acts much like an off-line system, the time factor is less sensitive and significant as it comes into system performance considerations. Thus, there is enough time for the scanners and detection tools to run the best algorithms they can, with the maximum possibilities and available features.

Finally, if the data was checked and no hostile code was detected, then the data will be moved from its temporary location in the SBC's memory to the appropriate location in the trusted network. Note that the data, in its temporary location, includes not only the content, but the original header, too. Before moving the data to its final location in the trusted network, the SBC extracts its content, converts this content into a separate bytes collection, sets the parameters of this new bytes collection (as was extracted from the header), and moves that new bytes collection to its final location in the trusted network.

The "data export" process is much like the "data import" process. However, although both processes are controlled by the master unit, and only by the master unit, the import process is intended to read data stored somewhere over the non-trusted network, while the export process is intended to expose the content of data, stored somewhere over the trusted network. Therefore, the content sensitivity is quite different. An imported data content is checked against viruses, Trojan horses, and other hostile executable codes. An exported data content is checked mainly against accidental exposure of confidential data.

In order to import data from the outside world, the system of the invention reads the data and then performs the transportation process described above. However, in order to export data from the trusted network, the system must first verify the source of the data, so as to ensure that the data is exportable. Preferably, the system explicitly identifies the owner of the data (i.e., who created and holds that data), although this is not required. In such cases, the data will be exported only after the data owner is confirmed. The export process uses the same transportation mechanism as does the import process described above.

Figure 5:
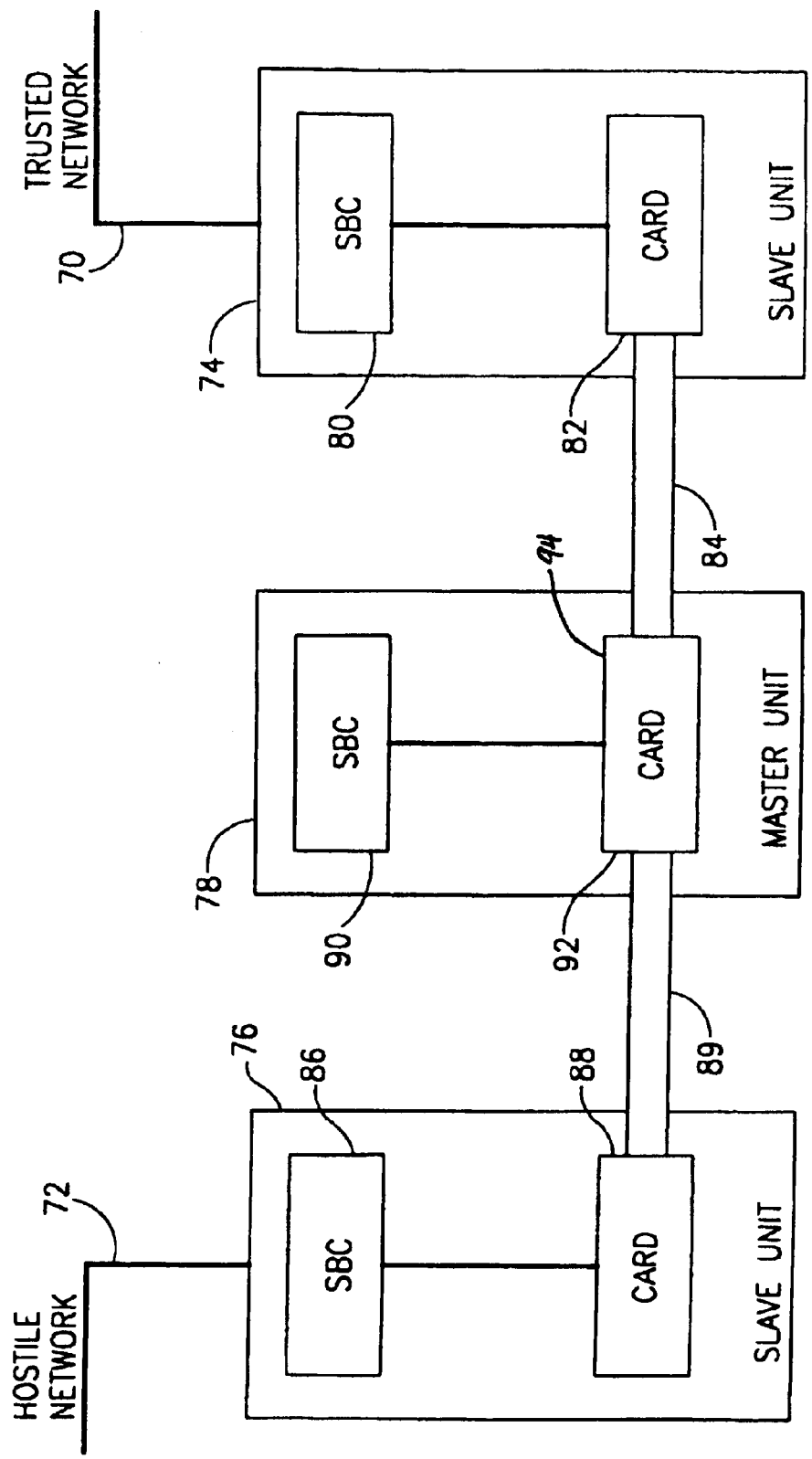
FIG. 5 is a schematic illustration of a system for securing a network according to another embodiment of the invention.

Referring now to FIG. 5, there is shown a schematic illustration of a three-stage device according to one embodiment of the invention inserted between a trusted network 70 and a non-trusted network 72. The three-stage device includes a first slave unit 74 connected to trusted network 70, a second slave unit 76 connected to non-trusted network 72, and a master unit 78 connected between first slave unit 74 and second slave unit 76.

First slave unit 74 includes a first slave computer 80 connected to trusted network 70, and a first slave wide bus gate card 82. First slave wide bus gate card 82 is coupled to first slave computer 80 by a computer bus, and is coupled to master unit 78 by a wide bus 84. Similarly, second slave unit 76 includes a second slave computer 86 connected to trusted network 70, and a second slave wide bus gate card 88. Second slave wide bus gate card 88 is coupled to second slave computer 86 by a computer bus, and is coupled to master unit 78 by a wide bus 89. Master unit 78 includes a master computer 90 and two wide bus gate cards 92, 94, one connected to each slave wide bus gate card.

The operation of the three-stage device is a little different from operation of the two-stage device. In the case of a three-stage device, the data is not moved directly into or out of the trusted network, since the master unit is isolated from both nets. Instead, the data is first imported from the slave unit coupled to the sender network to the isolated region where the master unit is located. The master unit then checks the data, and decides whether to delete it or to export it into the receiver network. It will be appreciated that each of these data transportation processes is the same as used by the two-stage device, described above. In each case, the master computer 90 initiates or authorizes the import and export processes.

It will further be appreciated by those skilled in the art that the three-stage device system offers a number of advantages relative to the two-stage version:

It isolates the master unit, where security decisions are made, from both sides. Network attacks on the security system itself cannot take place whether that attack originates from outside world users or inside traitors. In addition, critical information used by the master unit is also isolated and protected from access and attacks by both sides.

There is no way to cause other programs to start running in the master unit. Hence, this unit is absolutely free of accidental execution of viruses or other hostile programs.

While the two-stage device includes four different, independent sections (one SBC and wide bus gate card in each side), the three-stage device includes seven sections, one SBC in each unit and three or four wide bus gate cards, one in each slave and one or two in the master unit. Hence, a "bug", "crash" or any kind of error that could lead to a trusted network exposure becomes much rarer than in the two-stages device (although for both versions this possibility is practically nil).

It is a particular feature of the systems of the present invention that the networks are isolated not only physically, but also logically, so that data streaming is prevented. Thus, a node in the hostile network is not able to exchange data directly with a node in the trusted network. Instead, transported data must be handled by the system's internal kernels, involving the master and slave units, and neither the operating system nor the network kernel have any control of how data will be moved between the nets.

In addition, the standard computer communication protocols are non-operative between the two networks. Thus, the present system disables any initiation caused by the hostile side, no matter who tries to push data, where that data came from etc.

Furthermore, the present system forces the communication between the two sides to be hand-shake based. That means that the data must be accepted in the other side and a response to that incoming information must be provided, otherwise the data will not be moved.

As already described, in order to send a block of data through the wide bus gate card, one must know how to sign that block. Extraction of the secret key and the function permanent values, which are the only secrets that are required in order to correctly sign a block of data, is a very non trivial task. Take, for example, the secret key. It is a key which is very long, may be scrambled inside a stream of bits several orders of magnitude larger, somewhere in the memory space in a memory region that is re-addressable periodically, and is locked inside the memory area in such a way that it is never swapped with any disk page (thus no copy of that memory can be found in the disk). Moreover, the secret key value is changed from time to time as was previously explained. Alternatively, or in addition, the value of the secret key can be protected in any other fashion.

As long as the master unit does not perform a "data import" process, no intruder is capable of sending data into the trusted network. Even if the master unit requests to export data, an intruder cannot push his data, as the system pushes and pulls data in different channels, asynchronously.

It will be appreciated, that without help from someone inside the network, an intruder will not be able to overcome the master unit and create an effective data stream by which hostile material can be pushed into the trusted system. Even with insider help, it is extremely difficult to overcome all the unique elements in the system. And, if the master unit, the only unit that controls the flow of data, is isolated from the trusted network too, as in the case of a three-stage device, it is not only a very hard task to create a stream of data, it is very nearly impossible.

It is a further particular feature of the invention that the system is insensitive to software and hardware "bugs", crashes and other failures. Regarding bugs, the system of the invention includes four or seven sections depending on the system type. The networks are not connected, so at the time the system works, there is no data streaming or any network or operating system services between the networks. A situation where all these four or seven sections have a "bug" that bypasses each and every section functionality and creates a "short path", at the same time, is practically non-existent.

An operating system crash will not cause the system to suddenly connect the trusted network to the hostile one, since the wide bus gate cards are not operating system based circuits. These cards may be considered to be well debugged and stabilized sections. Since the wide bus gate card is the gate through which all communication sessions must pass, even in case of an operating system crash, back door, failure etc., the trusted network will not became connected to the hostile one.

In addition, there exist many configuration errors that can lead to very destructive results. Some of them are no longer relevant since the traditional services cannot be supported through the system's channels. Other configuration errors, that could lead to destructive or unpredictable results in conventional systems, are not problematic in the system of the present invention.

For example, perhaps the most dangerous situation occurs when a technician or administrator exchanges the jacks of the trusted network and the hostile network. In that case, the trusted network becomes the "hostile" one, and vice versa. However, even in that case, in the present invention the trusted network is not exposed to the outside world. One way to avoid such a situation is as follows. When the system is first installed, it creates a file somewhere in the trusted network. That file contains information randomly generated by the unit connected to the trusted side. Moreover, most preferably that information is randomly changed after data is completely moved, in or out, from the trusted network. Before any "data import" or "data export" process starts running, both sides of the system look for that file. If the unit which is supposed to be connected to the trusted side cannot find that file, and/or the one that is supposed to be connected to the hostile side can find that file, then the process will not take place. Only when the trusted side unit finds the file (and, of course, verifies its content), and the hostile side unit cannot find it, can a file transfer occur. Thus, exchanging the wires may lead to a warning message, but not to data leakage. It will be appreciated that there are also other ways for the master to confirm that it is connected to the trusted network.

One of the known targets of hackers is the configuration file. Intruders will try to modify that file or, at least, to read its content in order to learn the protection scheme and to find an already opened gate to come through. The system of the invention holds all configuration files in the master side. The slave units' configuration is pushed to the slave units at initialization time by the master unit. Thus, there is no file, block of data, or any kind of trace, that can be found in the slave unit disk, hence the configuration setup is protected.

A number of other security features can also be offered by the system. These include:

The slave units report their log events to the master unit. No log file or any other log report will be saved in the slave unit side. The master unit will keep all system log reports, for both his events and other units' events.

Each and every unit, whether it is a master or a slave unit, runs its own set of self-protect procedures. This set preferably includes:

If other running programs are detected, the unit locks its own wide bus gate card and tries to kill that program. As long as the detected program is running, the wide bus will remain inaccessible, hence transportation between the two nets will be denied.

If the system clock or calendar was changed, not by the system itself, the system will force the administrator to check the reason for that.

Any change of unit disk size, free space, number of directories or files etc., will lead to a system response that may vary from an administrator notification message, up to a "brute" reset of whole system.

Any "time-out" error while communicating with the wide bus gate card or the other units will lead to a system response that may vary from an administrator notification message up to a "brute" reset of whole system.

Any change in the IO architecture (such as addition of a new card) will lead to a system response that may vary from an administrator notification message up to a "brute" reset of whole system.

Any change of system hardware profile (such as disk replacement or addition, version replacement etc.) will force the administrator to confirm these changes.

It will be appreciated that, although the system of the invention presents a very non standard architecture and it is a non streaming-based transportation system, it meets a wide range of commercial applications, and it does not require any special interface or preparations. As an example, we will show how it meets the most popular application area where the security market is focused today, the Internet.

An Internet site is a directory somewhere in the world wide network, in a disk that belongs to a server, workstation or a PC client. Essentially, the Internet is a filed-based network, the HTTP standard is actually a "file import" and "file export" standard, and, in general, HTTP is a "data import" and "data export" protocol. Accordingly, the system of the invention can be used as an Internet connection gate for HTTP, FTP, electronic mail, and other protocols, having extremely tight security features.

There are many other kinds of applications where transported data is in static data form (i.e., block, record, or file). Connection between a trusted and non trusted network for such applications can be safely implemented through the use of the present system. Two extremely different examples are given below:

Fax servers. A fax server is a server that from one side is connected to a telephone line and from the other side is connected to the trusted network. Although basically that server functions as a fax receiver, there is no guarantee that other users, from the outside world, will not intrude on the trusted system through the telephone line. The system of the present invention can isolate the fax server from the trusted network, as it imports the fax files (.TIFF files) from the server disk into the trusted network.

Backup of confidential information. Confidential information exposure can be very damaging. Even without exposure of information, an organization may seriously suffer from unauthorized access or usage of confidential files. The system of the present invention can be used to import these files from all over the internal organization network into a backup network, one that is inaccessible to organization network users. Thus, these files will remain protected and access is denied, as the networks are not connected. In order to restore these files, the administrator must run the file export processes from the backup network itself, not from the users' net.

An additional use for the present system is to check for hostile content, such as viruses, which are passed over an encrypted communications channel. In conventional systems, it is virtually impossible to do this, since the private keys for encryption are not known to all. Without decryption of the data, examination for hostile content cannot take place. In the present system, on the other hand, the user's computer on the trusted network creates an encrypted channel to the master. The master and the computer both know the private keys and the public keys. The slave also creates an encrypted channel to the computer, generally, but not limited to, a server computer in the non-trusted network, to which the slave and the outside computer have a different set of public and private keys. When the master or slave receives data over the encrypted channel, they are able internally to decrypt the data (since, as stated above, each knows the relevant keys for its own channel), and send the decrypted data to be examined for hostile content, such as viruses, Trojan horses, Active-X components, Java scripts, defectors, etc. If there is no hostile content, the data is passed through the other unit (slave or master, whichever did not receive the data originally) to the second network, either re-encrypted or not encrypted, as required.

The present system can provide these security advantages as it takes advantage of the time domain aspect of computer communications. Systems security is a processor-based job but transportation of data is the network equipment job. Although in the past seven years, the processing performance grew very rapidly, the relative communication bandwidth remained constant or grew very slowly. Nowadays, when a moderate Internet connection speed used by big organizations is about 2M bits/sec (for small and medium size organizations the speed is even lower) and the in-computer mother-board bus speed is about 132M bytes/sec (more than 500 times faster), the remaining time can be utilized for enhanced performance by the network security system. In this case, that gap is used for better content checking, for a hand-shake based mechanism, for isolation implementation and more.

It will be appreciated that the invention is not limited to what has been described hereinabove merely by way of example. Rather, the invention is limited solely by the claims which follow.

What is claimed is:

1. A system for securing a trusted computer communication network comprising:
   a master decision maker unit coupled to the trusted network; and at least one slave communication unit coupled to the master unit by a wide bus connection that has multiple unidirectional communication channels, said slave communication unit being further connected to a non-trusted network;
   characterized in that:
   (i) a chip based circuit is provided between said trusted network and said non-trusted network thereby keeping said networks is physically and logically disconnected from each other at all times, by preventing data streaming therebetween;

(ii) all data transported between the trusted network and said non-trusted network is transported between said master unit and said slave unit in static form;

(iii) all data transported between the trusted network and said non-trusted network is transported through unidirectional communication channels, using a handshake mechanism solely controlled by said trusted side, thereby preventing data streaming therebetween.

2. The system according to claim 1, wherein said master unit includes a master computer coupled for standard computer communication with the trusted network, and coupled via a standard computer bus to a master wide bus gate card; and said slave unit includes a slave wide bus gate card coupled via a wide bus connection that has multiple unidirectional communication channels to said master wide bus gate card and via a computer bus to a slave computer which, in turn, is connected to said non-trusted network for standard computer communication.

3. The system according to claim 1, wherein the system further includes a second slave unit coupled between the trusted network and said master unit.

4. The system according to claim 3, wherein said second slave unit includes a second slave wide bus gate card coupled via a wide bus connection that has multiple unidirectional communication channels to a second master wide bus gate based card and via a computer bus to a second slave computer which, in turn, is connected to said trusted network for standard computer communication.

5. The system according to claim 2, wherein said computer includes a Single Board Computer, and said wide bus gate card includes a Field Programmable Gate Array (FPGA).

6. The system according to claim 2, wherein said computer includes a Single Board Computer, and said wide bus gate card includes an Application Specific Integrated Circuit (ASIC).

7. The system according to claim 2, wherein said wide bus gate card includes a CPU.

8. The system according to claim 1, wherein said non-trusted network is the Internet.

9. The system according to claim 1, wherein all data is encrypted using a data signature causing the data to become static data wherein static data is meaningless and non-executable.

10. The system according to claim 1, wherein all data is transported in message form between said master unit and said slave unit.

11. The system according to claim 1, further comprising an additional unit, connected to either said master unit or one of said slave units, to perform computations and help reach security decisions.

12. The system according to claim 1, further comprising a physically isolated De-Militarized Zone (DMZ) network coupled to said master decision maker unit.

13. A method for securing a trusted computer communication network while allowing data to pass between said trusted computer communication network and a non trusted network, comprising the steps of:

a. disconnecting the trusted network from all non-trusted computer networks;

b. inserting a system between the trusted network and non-trusted network that maintains a physical and logical disconnection between said trusted network and non-trusted network at all times by preventing data streaming therebetween yet allows passage of data thereacross;

c. enabling transportation of data between said trusted network and said non-trusted network only with approval of said master decision maker using a handshake mechanism and thereby preventing data streaming therebetween wherein said system comprises a master decision maker unit coupled to the trusted network and to a slave communication unit;

said master unit including a master computer and a master wide bus gate card;

said slave unit including a slave computer and a slave wide bus gate card;

said master unit being connected to said slave unit by a wide bus connection connecting said master wide bus gate card to said slave wide bus gate card;

and said wide gate cards including a chip based circuit that only allows static data to pass therethrough.

14. The method according to claim 13, further including the steps of:

(i) initiating a data import process by said master unit or by said slave communication unit with approval of said master unit;

(ii) transporting data from said non-trusted network to said slave computer;

(iii) receiving said data from said non-trusted network at said slave computer;

(iv) signing said data with data signature thereby causing data to become static; transporting said signed data form said slave wide bus gate card to said master computer;

(v) pulling said signed data and said data signature from said slave computer by said slave wide bus gate card;

(vi) pushing said data to the master wide bus gate card while simultaneously calculating and verifying the data signature by said slave wide bus gate card;

(vii) verifying, by said slave wide bus gate card, that the computed accumulated data signature subsequent to termination of the pulling of said signed data is correct; and, where said data signature is allowed, signaling allowance to said master wide bus card, but where said accumulated data signature is not allowed, providing a delete command to said master wide bus card in accordance with the result of said step of verifying;

(viii) encoding said data using a key generated by and known only to said master wide bus gate card;

vii) transporting said encoded data from said master wide bus gate card to said master computer;

(viii) verifying said data signature;

(ix) examining said data in said master computer or providing a delete command or transporting allowable data to trusted network in accordance with the result of said step of verifying said data signature.

15. The method according to claim 14, wherein said step of examining includes examining said encoded data while it is still encoded.

16. The method according to claim 14, wherein said step of examining includes:

providing said key from said master wide bus gate card to said master computer;

decoding said encoded data; and examining said decoded data.

17. The method according to claim 13, further including the steps of initiating a data export process by said master unit or by said slave unit with the approval of said master unit;

transporting data from a data owner in the trusted network to said master computer;

signing said data with a data signature;

transporting said data from said master computer to said master wide bus gate card;

transporting said data from said master wide bus gate card to said slave wide bus gate card;

encoding said data using a key generated by and known only to said slave wide bus gate card;

transporting said encoded data from slave wide bus gate card to said slave computer; verifying said data signature;

and transporting said data from slave computer to said non-trusted network or deleting said data, in accordance with the results of verifying said data signature.

18. The method according to claim 17, further including the step of examining said data in said master computer to authenticate said data owner after said step of signing.

19. The method according to claim 14, further comprising the step of examining, in said master unit, the data to be transported before transporting said data to or from the trusted network.

20. The method according to claim 17, further comprising the step of examining, in said master unit, the data to be transported before transporting said data to or from the trusted network.

21. The method according to claim 19, further including the step of reading said data to be transported as static data, and wherein said step of examining includes examining said static data for improper authorization and hostile programs.

22. The method according to claim 20, further including the step of reading said data to be transported in static data form, and wherein the step of examining includes examining each static data for improper authorization and owner authentication.

23. The method according to claim 13, wherein the non-trusted network is the Internet.

24. The method according to claim 23, further including the steps of:

inputting a list of sites to be imported into said master unit;

causing said master unit to instruct said slave unit to import specific site data;

examining said site data; and copying said site data into the trusted network.

25. The method according to claim 13, wherein said non-trusted network includes a fax server.

26. The method according to claim 13, further comprising the steps of importing confidential files from all over the trusted network into a backup network, that is coupled only to said master unit or said slave unit.

27. The method according to claim 13, further comprising the steps of:

encrypting data to be passed through said master unit or said slave unit over an encrypted channel;

causing the unit which receives said encrypted data over the encrypted channel internally to decrypt said data;

examining said decrypted data for hostile content; and if there is no hostile content, encrypting said data and passing said encrypted data through said unit which receives the data.

28. A method for securing a trusted computer communication network while allowing data to pass between said trusted computer communication network and a non trusted network, comprising the steps of:

disconnecting the trusted network from all non-trusted computer networks;

inserting a system between the trusted network and non-trusted network that maintains a physical and logical disconnection therebetween at all times by preventing data streaming therebetween yet allows passage of data thereacross;

wherein said system comprises a master decision maker unit coupled to the trusted network and to a slave communication unit;

said master unit including a master computer and a master wide bus gate card;

said slave unit including a slave computer and a slave wide bus gate card;

said master unit being connected to said slave unit by a wide bus connection connecting said master wide bus gate card to said slave wide bus gate card;

and said wide gate cards including a chip based circuit that only allows static data to pass therethrough;

wherein all data import processes into said trusted network occur over said wide bus connection through said chip based circuit, in accordance with the following steps:

(i) initiating a data import process by said master unit or by said slave unit subject to approval of said master unit and thereby enabling transportation of data between said trusted network and said non-trusted network only with approval of said master unit;

(ii) receiving said data from said non-trusted network at said slave computer;

(iii) signing said data with data signature thereby causing data to become static (iv) pulling said static data and said data signature from said slave computer by said slave wide bus gate card;

(v) pushing said signed static data to the master wide bus gate card while simultaneously calculating and verifying the data signature by said slave wide bus gate card;

(vi) verifying by said slave wide bus gate card that the computed accumulated data signature subsequent to termination of the pulling of said signed data is correct; and, where said data signature is allowed, signaling allowance to said master wide bus card, but where said accumulated data signature is not allowed, providing a delete command to said master wide bus card in accordance with the result of said step of verifying;

(vii) encoding said data using a key generated by and known only to said master wide bus gate card;

(vii) transporting said encoded data from said master wide bus gate card to said master computer;

(viii) verifying said data signature, and if allowed, examining said data by said master computer, however, if said data signature is not allowed, providing a delete command;

(ix) said step of examining includes (a) providing said key from said master wide bus gate card to said master computer;

(b) decoding said encoded data by said master computer;

(c) examining said decoded data by said master computer, and (d) providing said allowable data to said trusted network.

* * * * *